July 18, 1961 J. A. HANSEN ET AL 2,992,565
AUTOMATIC SPEED CHANGE MECHANISM
Filed March 10, 1958 5 Sheets-Sheet 1

INVENTORS
John A. Hansen
Kurt A. Riedel
BY
Attorney

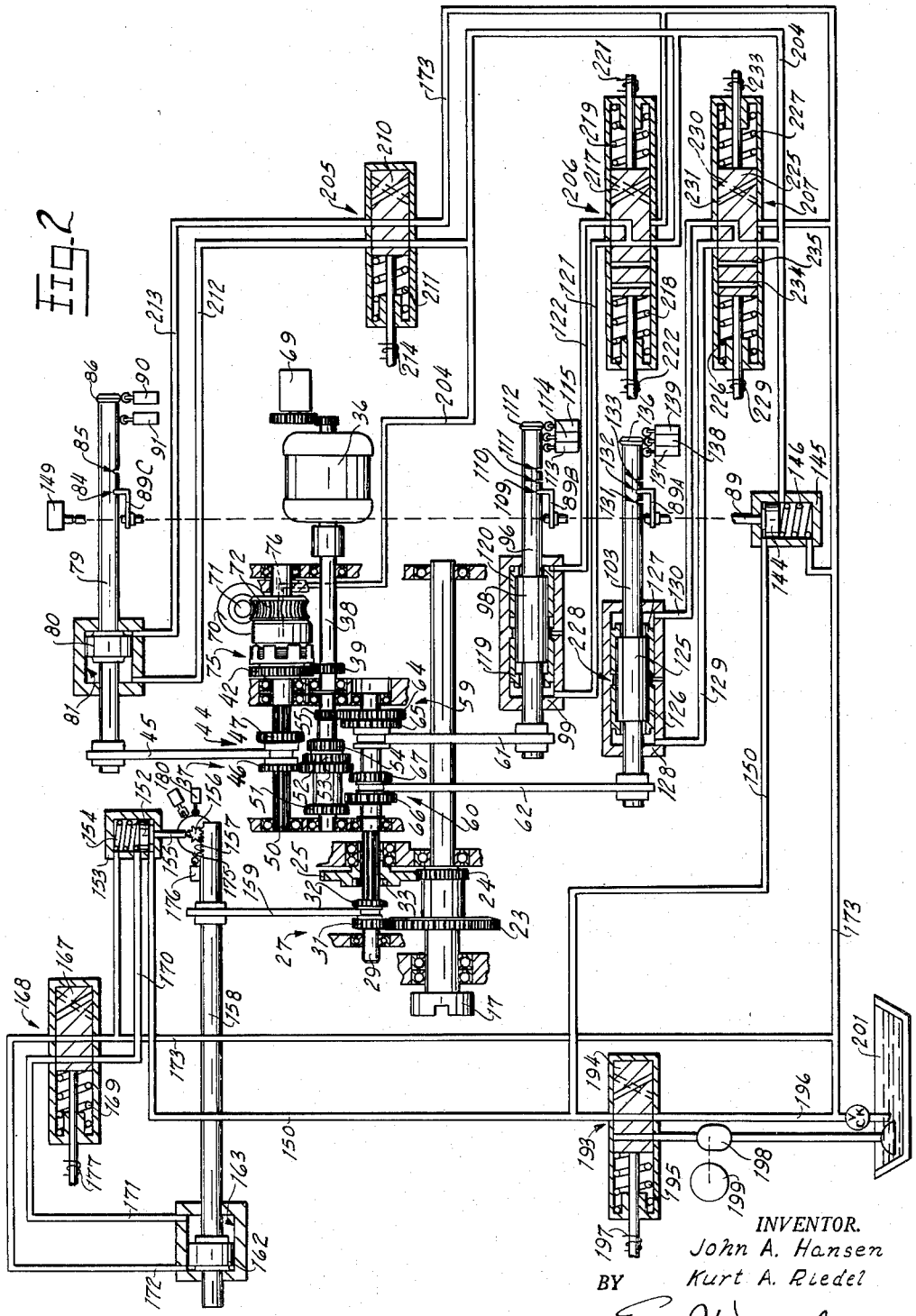

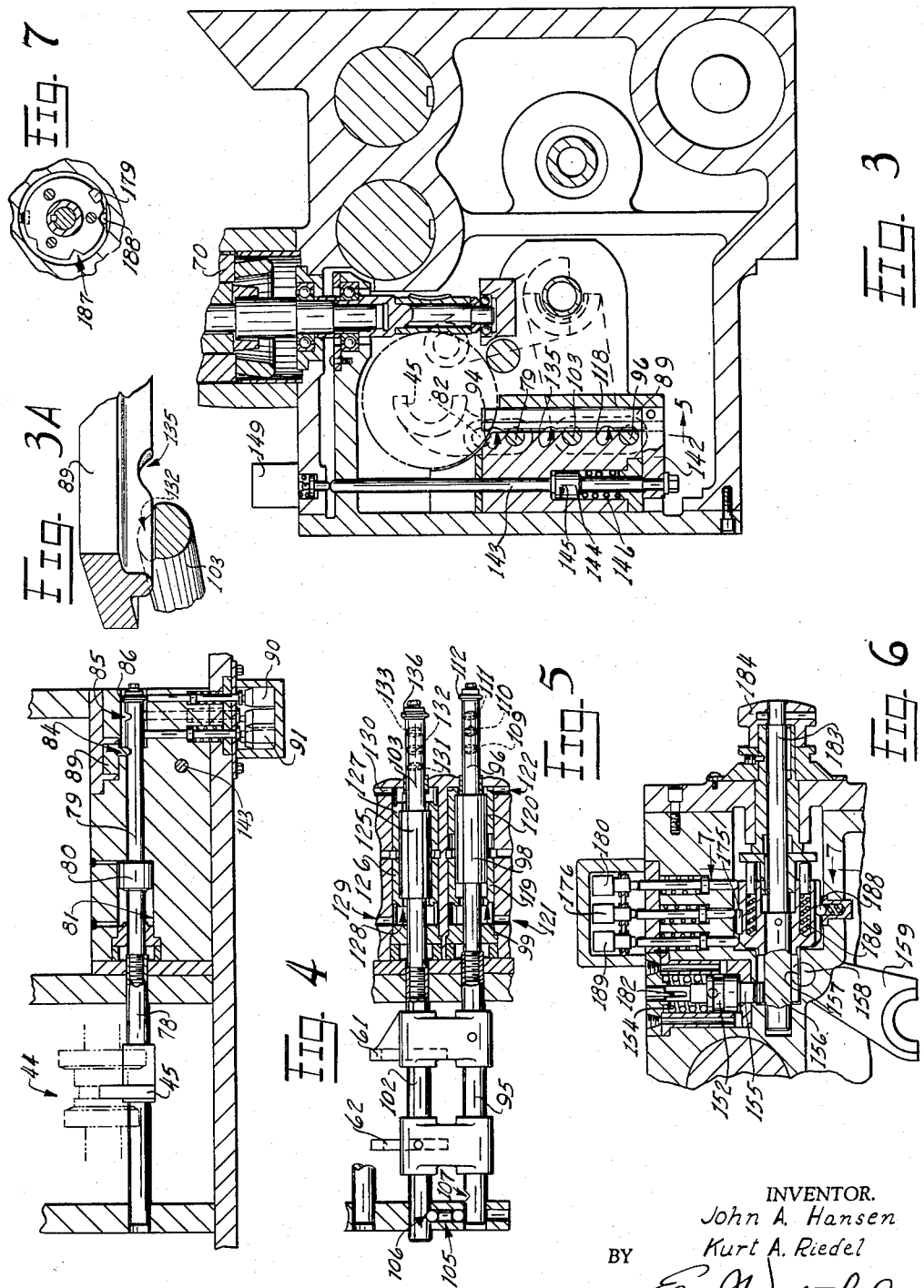

July 18, 1961

J. A. HANSEN ET AL 2,992,565

AUTOMATIC SPEED CHANGE MECHANISM

Filed March 10, 1958

INVENTOR.
John A. Hansen
Kurt A. Riedel

BY

Elroy J. Wutschel

Attorney

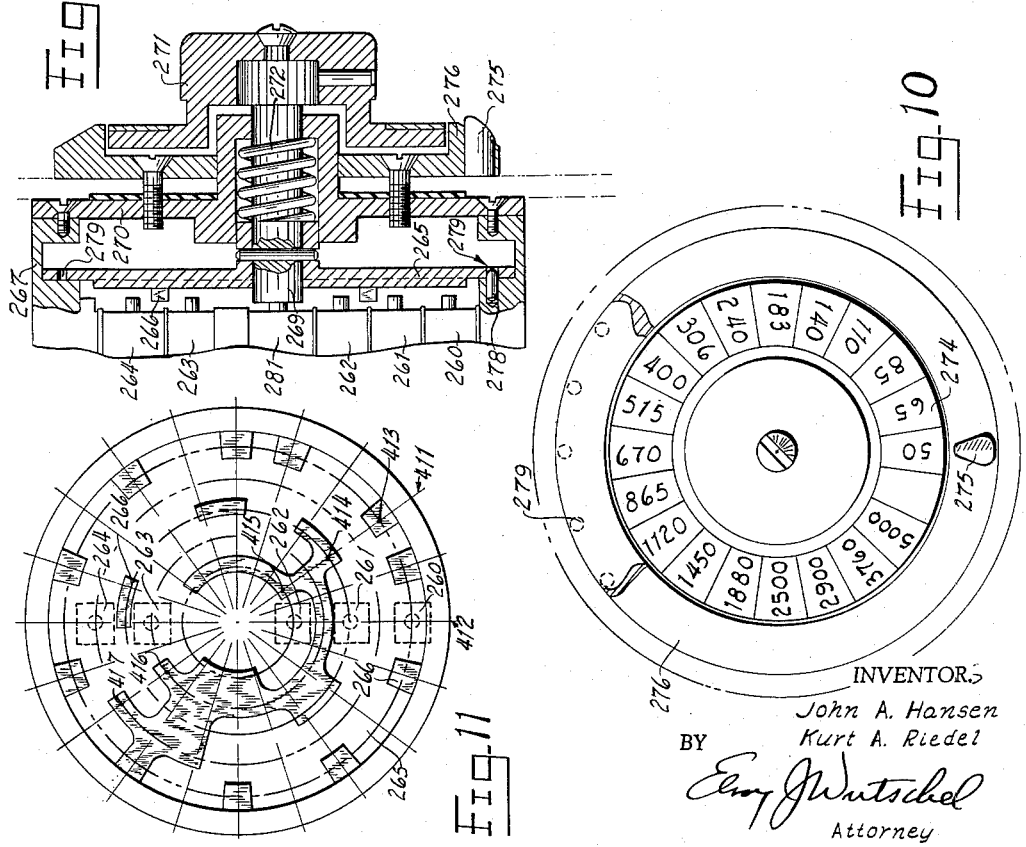

# United States Patent Office 2,992,565
Patented July 18, 1961

2,992,565
AUTOMATIC SPEED CHANGE MECHANISM
John A. Hansen, Greendale, and Kurt A. Riedel, Milwaukee, Wis., assignors to Kearney & Trecker Corporation, West Allis, Wis., a corporation of Wisconsin
Filed Mar. 10, 1958, Ser. No. 720,292
14 Claims. (Cl. 74—346)

This invention relates generally to variable speed transmission mechanisms, and more particularly to an improved automatic speed changing transmission mechanism for a machine tool.

A principal object of this invention is to provide an improved automatic gear shifting transmission mechanism for a machine tool.

Another object of the invention is to provide an improved electro-hydraulic machine tool shifting mechanism.

Another object of the invention is to provide an improved power actuated shifting mechanism for shifting a plurality of selectively intermeshing gears in predetermined coordinated relationship.

Another object of the invention is to provide an improved power actuated shifting control mechanism for a machine tool transmission, that is particularly suited to be remotely controlled by manipulation of a single speed selecting dial.

A further object of the invention is to provide an improved electro-hydraulic shifting mechanism for a machine tool that is responsive to an electrical control system arranged in binary code fashion to facilitate both manual and automatic control of speed selection from a remote control station.

A further object of the invention is to provide an improved automatic shiftable mechanism for a transmission in which interlocking means are provided to lock the shiftable gear elements positively in any selected speed setting.

A still further object of the invention is to provide an improved electrical control system for coordinating the operation of a plurality of hydraulically actuatable shifting devices in a machine tool transmission mechanism.

According to this invention, a machine tool is provided with a main driving motor connected to supply input power to a variable speed transmission mechanism of the shiftable gear type, that in turn is connected to drive the tool spindle at a selected speed rate. To vary the speed rate, a plurality of selectively shiftable gear elements are incorporated in the transmission mechanism and disposed to be shiftably interconnected in a manner to vary the driving ratio between the main motor and the tool spindle. For effecting gear shifting movements, each of the shiftable gear elements in the transmission mechanism is connected to be shifted by hydraulically actuated shifting pistons. The shifting pistons are connected to receive hydraulic fluid under pressure from a central hydraulic pressure system by means of a plurality of selectively energizable solenoid controlled hydraulic valves. The shiftable gears in the transmission mechanism are disposed to be shifted in a manner to provide a plurality of speeds arranged in approximate geometric progression, and, during shifting movement, are connected to be driven at an extremely low speed rate. As a prerequisite to admitting hydraulic pressure fluid to the various pistons for shifting the gears, the pressure fluid is first connected to disengage a plurality of mechanical interlocks. The mechanical interlocks or latches, when engaged, are adapted to preclude accidental shifting movement of any of the gears during machine operation. To energize the solenoid valves for effecting shiftable adjustment, a plurality of switch contacts are actuatable in binary code fashion to establish conditions of coincidence or anti-coincidence with position indicating switches that are actuated by the shifting pistons. Thus the existing shift conditions are compared with the required shift conditions to determine whether shifting is to be effected, shifting movements being effected as an incident to starting the driving motor. The switch contacts are connected to be actuated either in response to a manual selection dial, or an automatic digital control system for effecting automatic remote control of speed selection.

The foregoing and other objects of the invention which will become more fully apparent from the following detailed description of structure and control mechanism exemplifying preferred embodiments thereof, may be achieved by the particular apparatus described herein in connection with the accompanying drawings, in which:

FIG. 2 is a schematic drawing of the hydraulic control system connected to effect shiftable adjustment of the speed change mechanism;

FIG. 3 is an enlarged, detailed fragmentary view in transverse vertical section through a portion of the transmission mechanism showing the mechanical structure for locking the shiftable gears against accidental shiftable movement;

FIG. 3A is an enlarged fragmentary detailed view illustrating the releasable lock for the gear shifting rods;

FIG. 4 is an enlarged fragmentary view in longitudinal section showing one of the hydraulically actuated shifting pistons;

FIG. 5 is an enlarged fragmentary detailed view in longitudinal section showing two other of the shifting pistons and the associated gear actuating forks;

FIG. 6 is an enlarged, detailed fragmentary view in transverse vertical section showing the manual adjustment for the range changer and taken generally along the lines 6—6 in FIG. 1;

FIG. 7 is an enlarged fragmentary view in vertical section through the manual adjustment mechanism and taken generally along the line 7—7 in FIG. 6;

FIG. 9 is an enlarged fragmentary view in transverse section through the manually operable speed selection dial;

FIG. 10 is a view principally in elevation of the speed selection dial, showing the various speeds available upon shiftable adjustment of the speed change transmission mechanism;

FIG. 11 is a view in elevation of the speed selection cam plate; and,

FIG. 12 is a chart illustrating the binary code scheme of operation for selecting spindle speeds.

Figure 1:
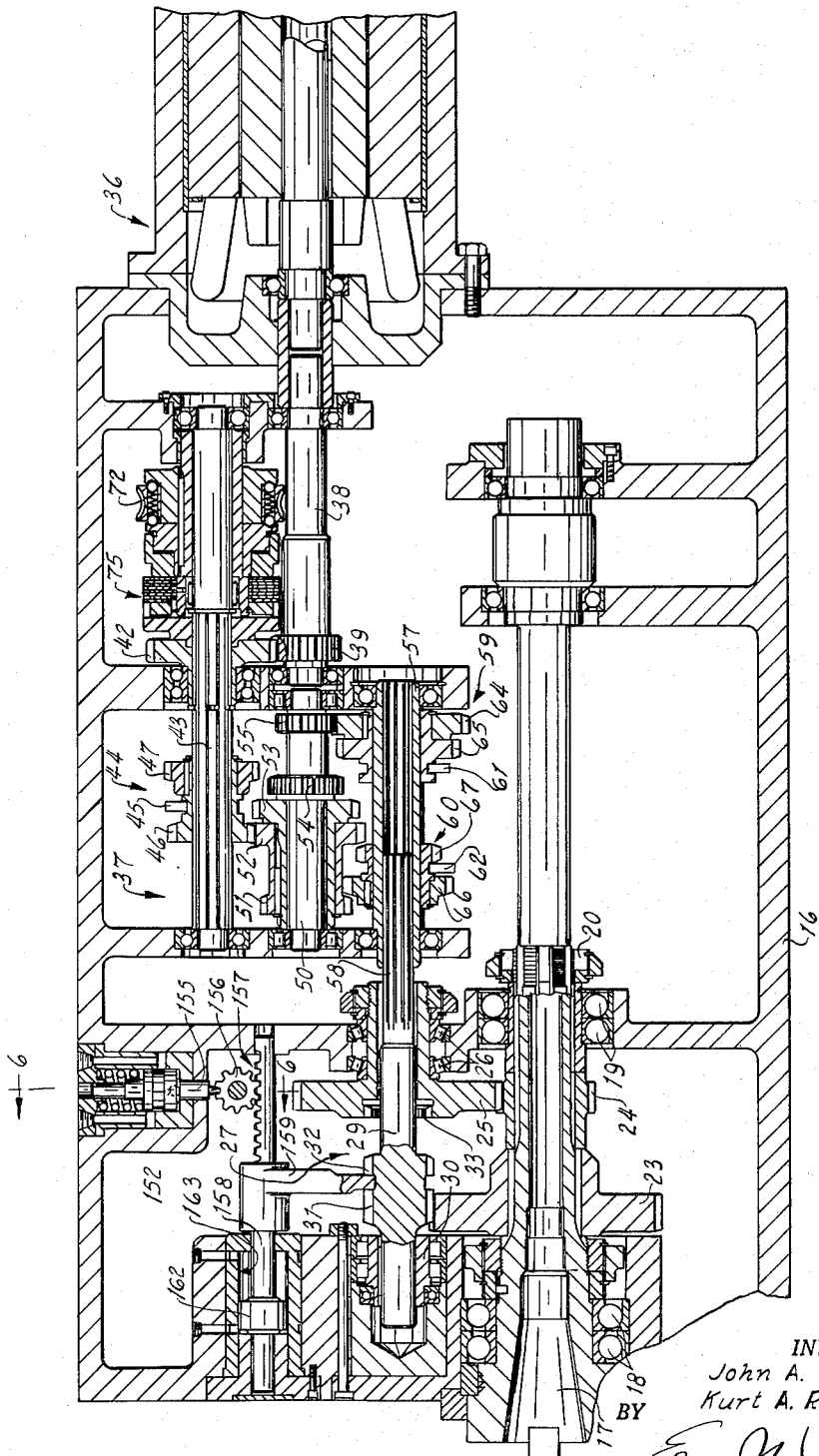
FIGURE 1 is an enlarged fragmentary view in longitudinal section through the improved speed changing transmission mechanism.

Referring to FIG. 1 of the drawings, a hollow frame 16 is disposed to support a rotatable tool spindle 17 as well as the associated spindle driving mechanism. As is customary in machine tool construction, the spindle carrying frame or head 16 is mounted in cooperative relationship to a work supporting member (not shown). The outwardly extending tool carrying end of the spindle 17 is adapted to removably support a milling cutter or boring tool in well known manner.

Spaced apart pairs of bearings 18 and 19 having their outer races supported within the frame 16 are disposed to rotatably support the forward end of the tool spindle 17, an adjusting nut 20 being provided to maintain these bearings in proper adjustment. For driving the tool spindle, a large low speed gear 23 and a smaller high speed gear 24 are keyed directly to the spindle, the gear 24 being meshingly engaged with an associated high speed gear 25. Bearings 26 are disposed to rotatably support the high speed spindle driving gear 25 in a position to constitute a portion of a range change mechanism 27. For driving the tool spindle 17 at one of two different speed ranges, an axially shiftable range change shaft 29 is carried for selective axial shifting movement, one end of the shaft 29 being supported for axial movement in a rotatable bearing 30 and the opposite end thereof being supported within a bored opening in the hub of the gear 25. With a gear 31 integrally formed with the shaft engaging the low speed gear 23, the spindle 17 is connected to be driven at a selected speed in a low range of operating speeds. Rightward axial shifting movement of the shaft 29 moves a gear 32 into meshing engagement with an internal clutch gear 33 presented by the gear 25 for driving the tool spindle 17 throughout a higher range of operating speeds.

Power for driving the shiftable shaft 29 of the range changer 27 is derived from a main drive spindle motor 36 secured directly to the rearward portion of the frame 16. As shown in FIG. 1, the motor 36 is connected to drive a speed changer 37 connected in series with the range changer 27 to supply power for driving the tool spindle 17. From the motor 36, power is transmitted to drive a shaft 38 carrying a gear 39 having continuous meshing engagement with a rotatable gear 42 splined to a rotatable splined shaft 43. From the shaft 43, power is transmitted to drive a longitudinally shiftable gear couplet 44 presenting an annular groove engaged by a selectively movable shifter fork 45. The couplet 44 is provided with a low speed gear 46 and a higher speed gear 47, disposed to be shiftably engageable in a manner to drive an adjacently journalled shaft 50 at a selected one of two speed rates. The shaft 50 has keyed to its periphery a plurality of gears including numbers 51, 52, 53, 54 and 55. With the gear 46 engaging the gear 52, as shown in FIGS. 1 and 2, power is transmitted from the shaft 43 to rotate the shaft 50 at the lowest driving speed. With the couplet 44 shifted leftwardly, the gear 47 engages the cooperatively meshing gear 53 to drive the shaft 50 at a higher rate.

In a similar manner, power is transmitted from the intermediate shaft 50 to drive an internally splined tubular sleeve 57 at a selected one of four different driving ratios. The tubular sleeve 57 has slidable splined engagement with an outwardly extending splined extension 58 integrally formed with the axially shiftable range change shaft 29. A pair of selectively shiftable gear couplets 59 and 60 are slidably keyed to the periphery of the tubular shaft 57, and are provided with annular grooves respectively engaged by shifter forks 61 and 62. With the high speed couplet 60 in neutral disengaged position as shown, and the low speed couplet 59 shifted rightwardly, a gear 64 secured thereto meshingly engages the gear 55 carried by the shaft 50. Shifting the couplet 59 leftwardly effects an operative interconnection between a gear 65 and the driving gear 54. With the low speed couplet 59 retained in neutral disengaged position, the couplet 60 may be shifted leftwardly in a manner that a gear 66 carried thereby engages the drive gear 51 secured to the shaft 50. The interconnection between the gear 51 and 66 provides the third ratio between the shaft 50 and the tubular sleeve 57. Moving the fork 62 rightwardly to engage a couplet gear 67 with the gear 52 provides the fourth driving ratio between the shaft 50 and the tubular sleeve 57.

Thus, depending upon the shiftable adjustment of the couplets 44, 59 and 60, the tubular sleeve 57 and the range change shaft 29 may be rotated at a selected one of eight different driving ratios arranged in approximate geometric progression. Since the range change mechanism 27 provides two distinct driving ranges, the tool spindle 17 is connectable to be rotated at a selected one of sixteen different speed rates, the eight driving ratios provided by the speed change transmission 37 being repeated in each of the different range changes.

To provide an even wider range of spindle driving speeds, the spindle driving motor 36 is of the two speed type, arranged to operate at either 1800 r.p.m. or 3600 r.p.m. As will hereinafter be more fully explained, and as shown by the chart on FIG. 12, the drive motor 36 is connected to operate at 1800 r.p.m. during the first sixteen of the spindle driving speeds, i.e. 50 to 2500 r.p.m. respectively. To provide three additional higher speeds, the motor 36 is connected to operate at 3600 r.p.m. with the speed change mechanism 37 and range change mechanism 27 adjusted to duplicate the highest three available driving ratios, thereby providing extremely high operating speeds of 2900 r.p.m., 3760 r.p.m., and 5000 r.p.m. respectively. The particular speed indicia shown in the chart in FIG 12 are provided only to illustrate the extremely wide range of spindle speeds available. Obviously, the range change mechanism 27 and speed change mechanism 37 could be so arranged as to provide different overall operating ranges, with each speed setting being proportionately different.

To facilitate gear shifting, as will hereinafter be more fully explained, the main drive spindle motor 36 is braked to a stop by means of a plugging switch 69 and the entire gear train including the speed changer 37 and range changer 27 is rotated at a slow speed by means of separately energizable creep motor 70. The creep motor 70 is connected to drive a worm 71 having meshing engagement with a worm wheel 72 carried for independent rotation about the rearwardly extending end of the separately rotatable shaft 43, as shown in FIGS. 1 and 2. Power is transmitted from the worm wheel 72 to rotate the shaft 43 by means of a selectively actuatable multiple disc clutch 75. Inasmuch as the operating details of this arrangement is well known in the art, it is deemed sufficient to state that the cooperating plates of the disc clutch 75 are engaged by means of hydraulic fluid under pressure admitted to a drilled line 76 formed in the rearwardly extending end of the shaft 43. Thus, to facilitate gear shifting, either of the range changer 27 or speed changer 37, the spindle motor 36 is braked to a stop, the creep motor 70 is energized, and the multiple disc clutch 75 is engaged by means of the admission of pressure fluid to the drilled line 76.

For shifting the couplet 44, as shown in FIGS. 1, 2 and 4, the actuating fork 45 is secured to a rod 78 carried for axial movement in a pair of spaced apart bored openings formed within the supporting frame member. An axially movable piston rod 79 is threadedly secured to the rod 78, and is provided on its central portion with a piston 80 constrained for movement within a two position hydraulic cylinder 81. To prevent rotational movement of the fork 45, the base section thereof is provided with a bored opening disposed to slidably engage a parallel circular support rod 82, as shown in FIG. 3. For retaining the fork 45 in shiftable position and to indicate when a shifting movement has been completed, the piston rod 79 is provided toward its rightward end with a pair of lock notches 84, 85 and a cam ring 86. With the fork 45 urged rightwardly to retain the gears 46 and 52 in engagement, the piston rod lock notch 84 is engaged by an axially movable locking bar 89 and the cam ring 86 is positioned to actuate switch 90. Prior to shifting the fork 45 leftwardly, it is necessary that the locking bar 89 be moved axially in a manner that an arcuate notch 94 formed therein is positioned to permit axial movement of the piston rod 79, as shown in FIGS. 3 and 4. After the piston 80 has been actuated to effect leftward fork movement, the locking notch 85 is engaged by the lock bar 89 and the cam ring 86 actuates switch 91.

In a similar manner, the fork 61 is pinned to an axially movable shifter rod 95 threadedly engaging a piston rod 96 having secured to its central portion a piston 98. The piston 98, in turn, is carried for axial movement within a three position hydraulic cylinder 99. To prevent rotational movement of the fork 61 as well as the actuating rod secured thereto, the fork support is provided with a circular bored opening disposed to slidably engage an adjacently positioned axially movable shifter rod 102. The shifter rod 102 is pinned to the fork 62, and is threadedly engaged by a piston rod 103. The base of the fork 62 is likewise provided with a circular bored opening disposed to slidably engage the actuating rod 95 that is fixedly secured to the fork 61.

An axially movable, interlocking type ball detent 105 is interconnected between the shift actuating rods 102 and 95 to preclude simultaneous engagement of the couplets 59 and 60. As shown in FIG. 5, the lower ball associated with detent 105 engages the periphery of the shaft 95, and the upper ball engages a detent notch 106 formed in the leftward end of rod 102 to preclude shifting movement of fork 62. It will be apparent that rod 95 must be moved leftwardly in a manner that a detent notch 107 permits downward movement of the detent 105 before rod 102 and the fork 62 secured thereto may be shifted. Toward its rightward end, the piston rod 96 is provided with three locking notches 109, 110 and 111 as well as a cam ring 112. Depending upon the shiftably adjusted position of the fork 61, the locking notches 109, 110 and 111 are disposed to be engaged by the axially movable locking bar 89. At the same time, the cam ring 112 is disposed to actuate a corresponding left switch 113, neutral switch 114, or right switch 115. With the fork positioned as shown and gear 64 engaging pinion 55, the locking notch 109 is engaged by locking bar 89 and the cam ring 112 actuates the associated position indicating switch 115. As a prerequisite to effecting shifting movement of fork 61, the bar 89 is moved axially in a manner that an arcuate notch 118 formed therein is positioned to permit axial movement of the piston rod 96, as shown in FIG. 3.

As shown in FIG. 5, the piston 98 is slidably carried within two independently movable positioning sleeves 119 and 120 that are in turn carried for movement within the three position hydraulic cylinder 99. Admission of hydraulic fluid under pressure through a port 121 effects rightward movement of the sleeve 119 as well as rightward movement of piston 98 for moving the gear 64 into engagement with the gear 55, FIGS. 2 and 5. Admission of pressure fluid through a port 122 effects extreme leftward movement of the sleeve 120 and piston 98 to move the gear 65 into engagement with the driving gear 54. For moving the fork 61 and couplet 59 into a neutral disengaged position, hydraulic fluid under pressure is simultaneously admitted through both of the ports 121 and 122, to urge both sleeves 119, 120 into abutting engagement with an annular ring within the cylinder.

The construction and operation of piston rod 103 is identical to that of piston rod 96. The piston rod 103 is provided with a piston 125 slidably carried within independently movable piston sleeves 126 and 127, that are, in turn, carried for movement within a three position hydraulic cylinder 128. Admission of hydraulic fluid through a line 129 effects rightward shifting movement of piston rod 103; admission of fluid through a line 130 effects leftward shifting movement; and, simultaneous admission of fluid through both ports moves the rod 103 to a central neutral position. For retaining the fork 62 in selected position, the rightward end of the rod 103 is provided with locking notches 131, 132 and 133 respectively disposed to be engaged by axially movable lock bar 89. Whenever the fork 62 is shifted, lock bar 89 is moved axially to align an arcuate notch 135 with the periphery of the rod 103, as shown in FIG. 3. For indicating whether the fork 62 is shifted to a leftward, neutral, or rightward position, a cam ring 136 secured to the piston rod 103 is disposed to respectively engage switches 137, 138 or 139.

As shown in FIG. 3, the locking bar 89 is moved axially to position the several arcuate notches 94, 135 and 118 simultaneously for effecting shifting movement of one or another of the piston rods 79, 103 and 96. The particular arrangement for locking one of the piston rods against axial movement, as well as positioning the locking bar 89 to permit shifting movement is shown more clearly in the enlarged, fragmentary perspective view, FIG. 3A. As there shown, the locking bar 89 is engaging the arcuate notch 132 formed in the axially movable piston rod 103. It will be apparent that bodily displacement of the bar 89 in a leftward direction will align the arcuate notch 135 formed therein to permit axial movement of the piston rod 103. To simplify the drawings and facilitate the description, however, the locking bar 89 is illustrated in the schematic view FIG. 2, as being provided with three projections 89A, 89B and 89C respectively disposed to simultaneously engage the locking notches presented by piston rods 103, 96 and 79. It will be readily apparent that downward movement of the single locking bar 89 (FIG. 2) will permit axial shifting movement of one or another of the piston rods.

As shown in FIG. 3, the locking bar 89 is pinned at its lower end to a lateral arm 142 that is fixedly secured to the outwardly extending end of a piston rod 143. The piston rod 143 is provided with a piston 144 movable within a hydraulic cylinder 145. Normally, a spring 146 within the cylinder urges the piston 144 and rod 143 upwardly to retain the locking member 89 in upward position to preclude axial movement of the piston rod 79, 103, or 96. With this condition existing, the upper end of the rod 143 actuates an interlock switch 149.

At the start of any shifting movement, the piston 144 is moved downwardly by the admission hydraulic fluid under pressure through a line 150, FIGS. 2 and 3, thereby effecting a corresponding downward movement of the lateral arm 142 and locking member 89.

Thus, before any of the couplets 44, 59, or 60 may be shiftably adjusted, the locking member 89 must be moved to disengaged position by admission of hydraulic fluid under pressure through line 150. Whenever fluid under pressure is admitted to the line 150, a piston 152 carried within a hydraulic cylinder 153 is moved upwardly in opposition to a spring 154 to permit automatic shiftable adjustment of the range change mechanism 27. A locking plunger 155 secured to the piston 152 is normally urged downwardly by means of a spring 154 into locking engagement with a manually rotatable range change pinion 156, as shown in FIGS. 1, 2 and 6. The pinion 156 is normally retained in engagement between the resiliently actuating locking plunger 155 and rack teeth 157 formed in one end of an axially movable piston rod 158. A shifter fork 159 secured to the piston rod 158 engages an annular groove formed in the axially shiftable range change shaft 29. Toward its opposite end, the piston rod 158 is affixed to a piston 162 slidably carried within a two position hydraulic cylinder 163.

With a valve spool 167 of a range change valve 168 urged rightwardly by a spring 169, as shown in FIG. 2, the range change piston 162 is moved leftwardly to retain the gear 31 in engagement with the low speed spindle gear 23. With the spool 167 in resiliently biased rightward position, admission of fluid from line 150 urges the piston 152 upwardly to retract the locking plunger 155. Upward movement of piston 152 permits a continued flow of fluid under pressure via a line 170, through a cannelure in the valve spool 167, to a line 171 connected to the cylinder 163. With this condition existing, pressure fluid is exhausted from the opposite side of piston 162 via a line 172, a groove in the valve spool 167 to an exhaust line 173. The upper end of the hydraulic cylinder 153 is also connected to the exhaust line 173. To indicate that the gear 31 has been moved into engagement with the gear 23, as shown in FIGS. 2, 6 and 7, a cam 175 secured to an enlarged hub integrally formed with the pinion 156 is disposed to actuate a position indicating switch 176. As soon as all shifting movements have been completed, the pressure line 150 is connected to exhaust permitting return movement of the piston 152 and locking plunger 155 into engagement with the manually rotatable pinion 156.

To effect rightward shifting movement of gear 32 into engagement with the high speed internal clutch gear 33, a solenoid 177 associated with range change valve 168 is energized to effect leftward movement of valve spool 167 prior to admitting pressure fluid to input line 150. With the valve spool 167 moved to leftward position, pressure fluid from line 150 effects upward retracting movement of piston 152 and continues through line 170, through a groove on the leftwardly displaced valve spool to line 172 to effect rightward movement of shifting piston 162. With this condition existing, the opposite side of the piston 162 is connected to exhaust via the line 171 connected through the leftwardly moved valve spool to the main exhaust line 173. With the range change mechanism 27 shifted rightwardly into high speed driving position, a cam 179, FIGS. 2 and 7, secured to the enlarged hub of pinion 156 is rotated into engagement with a position indicating switch 180. After the required shifting movements have been completed, pressure is withdrawn from line 150 to again permit downward movement of the locking plunger 155 into engagement with the manually rotatable pinion 156.

To retain the locking plunger 155 in proper angular position to engage pinion 156, the opposite end of the piston 152 is provided with a longitudinal slot disposed to engage an inwardly extending key 182, as shown in FIG. 6. Normally, as shown in FIGS. 1 and 2, the range change mechanism 27 is fully engaged either with the low speed spindle gear 23 or the high speed spindle gear 24.

For some purposes, it is advantageous to completely disconnect the spindle 17 from driving engagement with the range change mechanism 27. To this end, as shown in FIG. 6, the hub of the range change pinion 156 is secured to the inner end of a shaft 183, having secured to its outer end a manually adjustable knob 184. Thus, withdrawing the manually movable knob 184 outwardly effects a corresponding outward movement of the pinion 156 in opposition to peripherally spaced springs 186. It will be apparent that as the knob 184 is moved outwardly the pinion 156 is withdrawn from engagement with locking plunger 155, but retained in engagement with the rack teeth 157 presented by the axially movable piston rod 158. With the pinion 156 in outward disengaged position relative to locking plunger 155, the manual knob 184 may be rotated to move the piston rod 158 and shifter fork 159 to position both of the gears 31 and 32 in neutral disengaged position. The neutral position of the axially shiftable range change shaft 29 is indicated when a detent notch 187, FIG. 7, is engaged by a spring pressed detent 188. As will hereinafter be more fully explained, outward movement of the manual adjusting knob 184 effects operation of a switch 189, and rotational movement of the knob moves the cam lobes 175 and 179 to permit opening of both the switches 176 and 180. By reversing the described procedure, the range change mechanism 27 may be re-engaged in either its high or low range driving position.

To initiate any shiftable adjustment of the range change mechanism 27 or speed change transmission 37, there is provided a main solenoid actuated shift control valve 193. With a valve spool 194 of valve 193 urged rightwardly by a spring 195, the line 150 is connected via a cannelure in the valve spool to a main exhaust line 196. Energization of a solenoid 197 effects leftward movement of the valve spool 194, thereby connecting the line 150 for receiving hydraulic fluid under pressure. With this condition existing, a pressure pump 198 driven by a motor 199 is connected to transmit fluid from a sump 201 via a cannelure on the leftwardly energized valve spool 194 directly to the main pressure supply line 150. As hereinbefore explained, admission of pressure fluid to the line 150 effects simultaneous retracting movement of pistons 152 and 144, thereby retracting the respective locking members 155 and 89 to permit subsequent shifting of the range changer 27 and speed changer 37. With the locking members 89 and 155 urged into locking engagement by means of compression springs 146 and 154 respectively, there is provided a positive mechanical interlock to preclude axial shifting movement of any of the various piston rods. Retracting movement of pistons 144 and 152 in response to fluid pressure from line 150 effects a corresponding retracting movement of the locking members to interrupt or disengage the positive mechanical interlock. In addition, however, the pistons 144 and 152 function as hydraulic valves to control the flow of pressure fluid to any of the various shift control valves. As hereinbefore explained, the line 150 is not in communication with line 170 to effect a range change shift until the locking piston 152 is fully retracted. In a similar manner, retraction of piston 144 in opposition to spring 146 permits a continued flow of pressure fluid from supply line 150 to a hydraulic shift control line 204. The line 204, in turn, is connected to supply pressure fluid to predeterminately positionable, shift control valves 205, 206 and 207. The shift control valves 205, 206 and 207 are respectively interconnected between the pressure supply line 204 and shift control cylinders 81, 99 and 128.

Before proceeding with a detailed description of the transmission of fluid from line 204 to actuate the various speed change cylinders, it may be advantageous to note that the range change valve 168 and speed change valves 205, 206 and 207 are predeterminately positioned to effect a selected speed rate. In other words, before energizing solenoid 197 associated with the main shift control valve 193, the various shift control valves are so positioned as to effect immediate shifting movement of the transmission gears to obtain the required speed setting. It will be apparent that this arrangement greatly facilitates the changing of one spindle speed to another selected spindle speed, without the necessity of sequentially shifting all the gears in the transmission. Likewise, the arrangement of the main shift initiating control valve 193 and locking pistons 144 and 152 positively precludes inadvertent or accidental movement of the various shiftably adjusted gears during machine operation. This arrangement provides an important safety feature, in that both of the locking members 89 and 155 are positively retained in locking engagement, irrespective of the selected operating speed. The positive interlocks are arranged to continue even in the event of an accidental electric or hydraulic failure during operation of the machine.

The main drive spindle motor 36 is plugged or braked to a stop whenever the solenoid 197 of valve 193 is energized, and the creep motor 70 is energized. At the same time, the flow of fluid under pressure continues from line 204 through the drilled line 76 to effect engagement of the multiple disc clutch 75, thereby connecting the creep motor 70 to rotate the gear 42, as well as the other gears in the range and speed change mechanism to facilitate gear shifting.

During machine operation, and after a selected shiftable adjustment has been effected, all of the pressure supply lines connected to actuate the range change cylinder 163, and the speed change cylinders 81, 99 and 128 are connected to exhaust. In addition, as hereinbefore explained, the various gears are retained in selected shiftably adjusted position by means of engagement of the locking plungers 155 and 89. Inasmuch as no fluid pressure is necessary to retain the various gears in adjusted position during normal machine operation, the position of the valve spools for the actuating valves is immaterial at that time.

With a valve spool 210 of the valve 205 urged rightwardly by spring 211, the line 204 is connected through a groove on the rightwardly moved valve spool to a line 212 connected to its opposite end to hydraulic cylinder 81. Thus, admission of fluid under pressure to line 204, with this condition existing, operates to effect rightward movement of the piston 80 for engaging the gear 46 with the associated gear 52. With the valve spool 210 in rightward position, the opposite end of the cylinder 81 is connected via a line 213 and a groove in the valve spool 210 to the exhaust line 173. After a shifting movement has been effected, and the lock member 89 resiliently urged upward into locking engagement with the piston rod 79 as shown in FIG. 2, the line 204 is connected via the lower end of cylinder 145 to the exhaust line 173.

As illustrated in FIG. 2, a valve spool 217 of the valve 206 is maintained in a central neutral position by means of compression springs 218 and 219. Thus, both of the lines 121 and 122 connected to the opposite ends of cylinder 99 are connected via a cannelure on the valve spool 217 to the line 204 which is connected to the exhaust line 173, since the piston 144 is in resiliently biased upward position. Admission of fluid under pressure to line 150 when the valve spool 217 is in its central position, operates to urge piston 144 downwardly and supply pressure to the line 204, and thence through the valve spool 217 to both of the lines 121 and 122, thereby shifting the piston 98 and the gear couplet 59 to neutral disengaged position. Energization of a solenoid 221 effects rightward movement of the valve spool 217 thus connecting the supply line 204 to the line 121, and the line 122 to the main exhaust line 173. With this condition existing, admission of fluid under pressure to line 204 effects rightward shifting movement of the sleeve 119 and piston 98 to their extreme rightward positions, in a manner to engage the gear 64 with the low speed driving gear 55. In a like manner, energization of a solenoid 222 effects leftward movement of the valve spool 217 thereby connecting the pressure supply line 204 to the line 122 and the line 121 directly to the main exhaust line 173. With such a condition existing, admission of pressure fluid to line 204 effects movement of the piston 98 to its extreme leftward position in a manner to engage the gear 65 with the gear 54.

The speed change valve 207 operates in identical manner to the speed change valve 206, both of them being provided with three position valve spools 225 and 217 respectively. Thus, with the valve spool 225 of the valve 207 retained in a central neutral position by means of springs 226 and 227, the pressure supply line 204 is connected via a cannelure on the valve spool 225 to the lines 129 and 130, connected to the opposite ends of the hydraulic cylinder 128. As soon as the piston 144 is hydraulically actuated to its lower position, pressure fluid admitted to the pressure supply line 204 flows through the centrally moved valve spool 225 to both of the lines 129 and 130, thereby urging the cooperating sleeves 126 and 127 to their inner positions in abutting engagement with the opposite faces of a flanged thrust member 228. To shift the gear 66 into engagement with the driving gear 51, a solenoid 229 is energized to effect leftward movement of the valve spool 225, thus connecting the pressure supply line 204 via a cannelure 230 to the line 130. Pressure fluid from line 130 effects leftward shifting movement of the sleeve 127 and piston 125, the opposite end of the cylinder 128 being connected via line 129, a valve spool cannelure 231 to the main exhaust line 173. The fork 62 may be shifted rightwardly for engaging gear 67 with drive gear 52 by energizing a solenoid 233 to effect rightward movement of the valve spool 225. Movement of spool 225 to its rightward position connects the pressure supply line 204 to the hydraulic line 129 via a valve spool cannelure 234. At the same time, the line 130 is connected via a cannelure 235 to the exhaust line 173.

Figure 8:
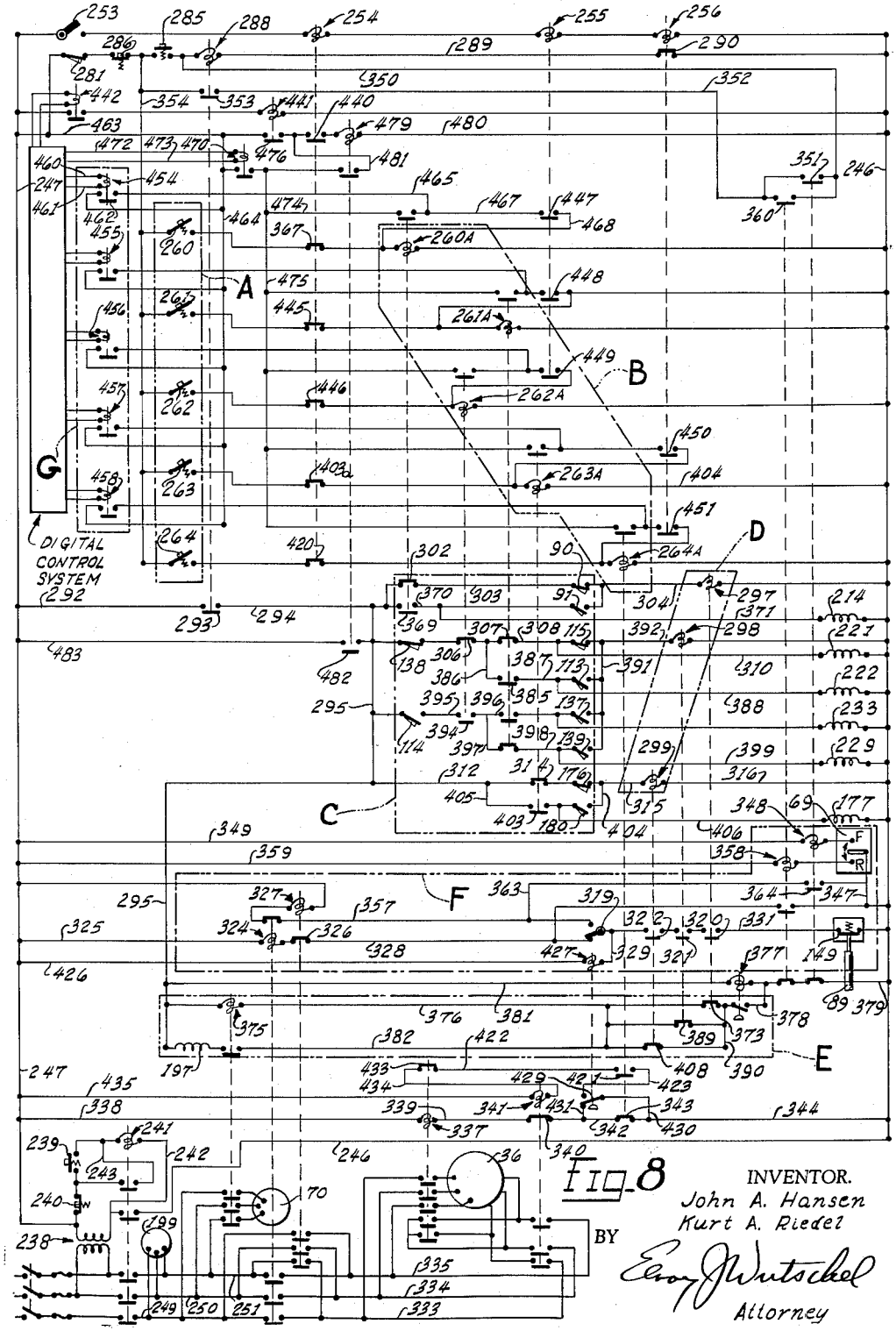
FIG. 8 is a diagrammatic showing of the electrical control circuit for energizing the main drive motor to drive the tool spindle, and for effecting shiftable adjustment of the variable speed transmission mechanism.

The electrical control system for actuating the automatic speed changing transmission mechanism, as well as energizing the motors 36, 70 and 199 is shown schematically in FIG. 8. As there indicated, three phase current from the usual three phase source is transmitted via a fused disconnect switch to energize corresponding three phase conductors, two of which are connected to energize the primary winding of a transformer 238. The secondary of transformer 238 is connected to supply current of reduced voltage to an actuating control circuit represented by light lines in the drawing. To energize the control circuit, a start button switch 239 is momentarily depressed, thereby completing the circuit from one terminal of the transformer through the normally closed contact bar of a stop switch 240, through the coil of a master start relay 241 to a conductor 242, connected at its opposite end to the secondary transformer winding. A holding circuit for retaining the master relay 241 in upward energized position is completed via a conductor 243 and the upwardly closed upper contact bar of the relay 241. At the same time, another circuit is completed through the closed contact bar of the relay 241 to energize a control circuit conductor 246, another conductor 247 being energized directly from the opposite terminal of the secondary transformer winding. Energization of the relay 241 to upwardly closed position completes a circuit through the three lower contact bars thereof to transmit power supply current from the three phase line conductors to energize conductors 249, 250 and 251. The conductors 249, 250 and 251 are connected directly to effect energization of the pump driving motor 199, as well as condition the power supply circuit for subsequent energization of either the main drive spindle motor 36 or the creep motor 70.

As shown in FIG. 8, a switch 253 is provided to condition the control system for either manual automatic speed selection, or speed selection in response to the signals derived from a digital control system. Closure of the switch 253 completes a circuit from energized control conductor 247 to energize relays 254, 255 and 256, which are connected to the energized control conductor 246. With the switch 253 closed, the circuit is conditioned for automatic digital controlled operation of the speed transmission and the associated motors. With the switch 253 manually moved to open position, as shown in FIG. 8, relays 254, 255 and 256 are de-energized, thus conditioning the system for manually initiated automatic operation.

For selecting a particular speed of tool spindle operation, it is necessary to predeterminately and coordinately position a plurality of selector switches 260, 261, 262, 263, and 264. As illustrated in FIG. 12 under the legend "binary code," the selector switches are coordinately actuated to obtain a selected speed setting, and to effect subsequent energization of the solenoids for moving the shifter forks to the respective positions as indicated for each speed. As shown in FIGS. 9 and 11, the selector switches 260 to 264 inclusive are coordinately actuated in accordance with the rotatably adjusted position of a cam plate 265. As shown in FIG. 11, cam lobes are indicated by shaded areas, such as 266, and are presented by the cam plate 265 in a manner to actuate the selector switches in predetermined relationship as the cam plate 265 is angularly adjusted. The cam plate 265 is carried for both rotatable and axially outward movement within a hollow housing 267, the latter being disposed to support the selector switches 260 to 264 inclusive in operative relationship thereto. A central hub of the cam plate 265 is pinned to a shaft 269 supported within bored openings formed in a central portion of a circular support plate 270 secured to the housing 267. At its outer end, the shaft 269 is secured to a manually movable speed selector knob 271, a spring 272 carried within an enlarged bored opening formed in the support plate 270 being normally operative to urge the cam plate 265 into inward switch engaging relationship. As shown in FIGS. 9, 10 and 11, the selector knob 271 is provided with indicia 274 corresponding to the speeds available from the transmission, and disposed to be read against an indicating marker 275 presented by a circular plate 276 secured to the support plate 270. To retain the selector knob 271 and cam plate 265 in a selected position of angular adjustment, a pin 278 carried within the housing 267 is disposed to engage one or another of a plurality of peripherally spaced holes 279 formed in the cam plate 265. It will be apparent, that each of the holes 279 is spaced in accordance with the indicia provided on the selector knob 271. With the knob 271 positioned as shown in FIGS. 9, 10 and 11, all of the selector switches 260 to 264 inclusive are in normally open position, corresponding to the speed setting 50 r.p.m. as shown in FIG. 12. Referring to FIG. 12, it will be apparent that the speeds extending from 50 to 5000 r.p.m. are numbered 0 to H15 to simplify coding. The speeds 50 to 2500 r.p.m. are obtained by positioning the selector knob 271 to actuate the selector switches as indicated, and with the main drive spindle motor energized to rotate at 1800 r.p.m. The speeds 2900, 3760, and 5000 r.p.m. are obtained with the main drive spindle motor energized to rotate at 3600 r.p.m., and with the selector switches 260 to 263 being actuated in identical manner to that for obtaining speeds 1450, 1880 and 2500 r.p.m. respectively.

Axial outward movement of the selector knob 271 permits an interlock switch 281, FIGS. 8 and 9, to move to normally open position, to automatically de-energize the spindle drive motor 36 and plug it to a stop. The transmission is thus protected against inadvertent manipulation of the selector knob 271 to change speeds while the motor 36 is energized to drive the transmission and tool spindle.

Before proceeding with a detailed description of the control circuit, it will be advantageous to consider the functioning and operation of the circuit components in general terms. Irrespective of whether the spindle is to be started at an original selected speed or a different selected speed, a spindle start button switch 285 is momentarily depressed to effect energization of the spindle drive motor 36. First it will be assumed that the speed selector switches, indicated generally within the broken line box A, have been positioned to effect a different speed setting and immediately operate to effect a corresponding energization of five "shift required" relays indicated generally within the broken line box B. With this condition established, the "shift required" relays will be so activated as to effect anti-coincidence in a shift determining portion of the circuit indicated within the box C in FIG. 8. A condition of anti-coincidence within the box C precludes energization of one or another of three shift verification relays, indicated within the box D. Thus, depressing the start switch 285 initially effects operation of a creep-shift portion of the circuit, shown within the box E, since one or another of the verification relays in the box D are not energized. As soon as the required shift has been effected, coincidence is established within the box C to effect simultaneous operation of the three verification relays within the box D, thereupon deactivating the creep-shift portion of the circuit (E), and activating the spindle motor start portion of the circuit indicated within the box F. As soon as this occurs, a holding circuit is established to retain the spindle motor 36 energized.

In the event the spindle motor is to be re-energized for operating the spindle at the same speed, coincidence will have already been established in the shift determining portion of the circuit C. Depressing the spindle start switch 285, with this condition existing, effects immediate energization of the three shift verification relays contained within the box D to activate the spindle motor start portion of the circuit contained within the box F, and complete a holding circuit for retaining the spindle motor 36 energized. It will be noted that the creep-shift portion of the circuit indicated within the box E is not activated unless one or another gear shifting movement is required, this condition being established only when anti-coincidence exists within the shift determining portion of the circuit C. Another way of stating this is that the selector switches (A) condition the "shift required" relays (B) for supplying a predetermined input signal to the shift determining portion of the circuit (C). The input signal from the "shift required" relays is compared with the then existing shiftably adjusted position of the transmission gears, as indicated by the shift position indicating switches. Coincidence between the input signals and the position indicating switches or memory effects immediate simultaneous energization of the verification relays (D). Anti-coincidence between the input signal and the position indicating switches or memory precludes energization of all of the verification relays, thus immediately effecting the required shifting movements.

As illustrated in FIG. 8, the control circuit is shown as being conditioned for obtaining spindle operation at 50 r.p.m., and with the various shift indicating switches positioned as though this shift had already been completed. Selector switches 260 to 264 inclusive are in open position with the range changer 27 and speed transmission 44 shiftably adjusted to provide operation at 50 r.p.m. As shown in FIGS. 2 and 8, the shift indicating switch 90 is moved to closed position by the cam ring 86. In addition, indicating switch 115 is actuated to closed position by cam ring 112, and the neutral indicating switch 138 is actuated to closed position by cam ring 136. Likewise, the range change indicating switch 176 is retained in closed position to indicate that the low speed drive gear 31 is in engagement with the low speed spindle drive gear 23.

With this condition existing, the spindle motor 36 may be energized for operation at 1800 r.p.m. by momentarily depressing the spindle start button switch 285. Depressing the start button switch 285 completes a circuit from the control conductor 247, through the closed interlocking switch 281, the normally closed contact bar of the spindle stop switch 286 to one terminal of a coil for a control relay 288. The coil of the relay 288 is energized to upward closed position, the opposite terminal being connected via a conductor 289 and a normally closed contact bar 290 of the relay 256 to the control conductor 246. Energization of the relay 288 closes a contact bar 293 associated therewith to complete a circuit from the conductor 247, a conductor 292, the closed contact bar 293, to a conductor 294 connected to a conductor 295. Inasmuch as the required shiftably adjusted positions have already been effected, energization of the conductor 295 completes circuits for immediately energizing the respective coils of three shift verification relays 297, 298 and 299 to energized closed positions.

From the energized conductor 294, a circuit is completed through a closed contact bar 302, a conductor 303, the closed shift position indicating switch 90, and a conductor 304 to one terminal of the coil for the relay 297. The opposite terminal of the coil for the relay 297 is connected directly to the energized control conductor 246. Another circuit is completed from the energized conductor 295, through the closed shift position indicating switch 138, and thence through normally closed contact bars 306 and 307 to a conductor 308. From the conductor 308 the flow of current continues through the closed position indicating switch 115, and thence through the coil of the relay 298 to the conductor 246. In a similar manner, another circuit is completed from energized conductor 295 via conductor 312, a normally closed contact bar 314, the closed position indicating switch 176 to a conductor 315. From the conductor 315, the flow of current continues through the coil of the relay 299 and through a conductor 316 to the conductor 246.

With a manual direction switch 319 positioned for forward motor rotation, as shown, closure of contact bars 320, 321 and 322 respectively associated with energized verification relays 297, 298 and 299 completes a circuit for energizing the coil of a forward motor relay 324. This circuit is completed from energized control conductor 247, via a conductor 325, through the coil of the relay 324 and thence through the normally closed contact bar 326 of a reverse motor starter 327 to conductor 328. The circuit continues from conductor 328, through the closed direction control switch 319, a conductor 329, closed contact bars 322, 321 and 320 to a conductor 331. Since the locking member 89, FIGS. 2 and 8, is in upwardly engaged position, the circuit continues from the energized conductor 331 through the closed shift completed switch 149 to the energized control conductor 246. Energization of the forward motor relay 324 to upward closed position effects like movement of the three lower contact bars associated therewith to transmit current from conductors 249, 250 and 251 to conductors 333, 334 and 335 respectively. From the energized power supply conductors 333, 334 and 335, current is transmitted via the closed contact bars of an energized low speed motor relay 337 for energizing the spindle motor 36. The circuit for retaining the low speed motor relay 337 in energized closed position is completed from energized conductor 247, a conductor 338, through the coil of a relay to a conductor 339. From the conductor 339, the circuit continues through a normally closed contact bar 340 of a de-energized high speed motor relay 341 to a conductor 342, and thence through a normally closed contact bar 343 to a conductor 344 connected to the energized conductor 246.

As soon as the spindle motor 36 begins to rotate upon energization of the forward motor start relay 324, the movable contact bar of the zero speed or plugging switch 69 is urged upwardly into bridging engagement between a conductor 347 and one terminal of a coil for an auxiliary plugging relay 348. With the movable contact bar of plugging switch 69 maintained in upward position a circuit is completed through the coil of the relay to a conductor 349 connected to the energized control conductor 247. Energization of the relay 348 to upward closed position completes a holding circuit for retaining the control relay 288 in energized closed position. The holding circuit for the relay 288 is completed through a conductor 350, the upwardly closed contact bar 351 of energized relay 348, a conductor 352, a closed contact bar 353 of the energized spindle starting relay 288 to an energized conductor 354.

Irrespective of either the selected speed or direction of motor rotation, the spindle motor start button switch 285 is retained only momentarily in depressed position before all of the intervening circuit connections are effected, and the holding circuit completed through the upwardly closed contact bars 351 and 353 as described. Likewise, the spindle start button switch 285 is retained in depressed position momentarily even in the event the gears in the transmission mechanism are shiftably adjusted prior to energization of the spindle motor 36 at selected speed. It will be apparent, that a starting condition similar to that described would occur in the event the direction selector switch 319 had been manually positioned to effect reverse rotation of the spindle motor. In such a case, a control circuit for reversed spindle motor rotation would subsequently be completed from energized control conductor 247, through the coil of the reverse motor relay 327, a normally closed contact bar associated with the de-energized forward motor starter 324 to a conductor 357. This circuit would then be completed from conductor 357, the upwardly closed contact bar of the reversedly positioned direction switch 319, the upwardly closed contact bars 322, 321 and 320 to the conductor 331 connected through the closed switch 149 to conductor 246. During reversed rotation of the spindle motor 36, however, the movable contact bar associated with plugging switch 69 is moved downwardly into bridging engagement between conductor 347 and a conductor connected to one terminal of a coil for a reverse motor auxiliary plugging relay 358. Energization of the relay 358 is then completed through a conductor 359 connected to the energized control conductor 247. During reversed motor rotation, the holding or seal-in circuit is completed through an upper closed contact bar 360 of the auxiliary relay 358, thus maintaining the control relay 288 in energized closed position.

Assume now that the motor 36 is rotating in a forward direction at 1800 r.p.m. to effect the lowest speed spindle operation (at 50 r.p.m.), as hereinbefore described. It will be apparent that both motor and spindle rotation will stop upon momentarily depressing a stop switch 286 to interrupt the holding circuit to the control relay 288. In addition to this, axial withdrawal of the speed selecting knob 271, FIG. 10, operates to actuate switch 281 to stop motor operation, as a prerequisite to selecting a different spindle speed. In either case, de-energization of the main control relay 288 permits movement of the contact bar 293 to an open position thus interrupting the previously established holding circuits to the coils of the shift verification relays 297, 298 and 299. De-energization of these relays in turn permits contact bars 320, 321 and 322 associated therewith to drop to open position, thus interrupting the circuit to the forward motor relay 324. Simultaneously therewith, a plugging circuit is then established from the conductor 247, through the coil of the reverse motor relay 327, the closed upper contact bar of de-energized relay 324 to the conductor 357. The plugging circuit continues from conductor 357 via a conductor 363 and the closed contact bar 364 of energized forward relay 351, which is retained in energized condition as long as the movable contact bar plugging switch 69 is urged upwardly by forward motor rotation. The reverse plugging switch circuit is completed from closed contact bar 364 through the conductor 347 to the energized control conductor 246. As is well known in the art, the reverse motor relay 327 is retained in energized closed position sufficiently long to permit immediate stopping of forward motor rotation, which results in the movable contact of plugging switch 69 moving to a neutral position and de-energization of plugging relay 348.

In the event the spindle is to be operated at a different speed than the particular 50 r.p.m. speed shown and described in connection with the drawings, the manual speed selecting knob 271 is withdrawn and rotated to the desired new setting. Rotation of the knob 271 repositions the cam plate 265 in a manner that one or another of the selector switches 260 to 264 inclusive is actuated to closed position by engagement with the cam lobes. Whenever both of the control conductors 246 and 247 are energized, closure of the selector switches 260 to 264 inclusive immediately effects energization of corresponding shift required relays 260A to 264A inclusive. It will be apparent that movement of selector switch 260 to closed position completes a circuit from the energized conductor 354 through the normally closed contact bar 367 of the automatic mode relay 254, and thence through the coil of the shift required relay 260A to the control conductor 246. In a similar manner, energization of one or another of the selector switches 261 to 264 inclusive will effect like energization of the corresponding relays 261A to 264A inclusive. Movement of the relays 260A to 264A inclusive to either energized or de-energized position, as long as this movement does not coincide with relay condition for the previous speed setting, immediately conditions the control circuit for effecting a shiftable adjustment of the transmission, upon momentarily depressing the spindle start switch 285.

An examination of the shift determining portion of the circuit within the broken line box C, in FIG. 8, indicates that the contact bars respectively associated with the shift required relays operate in conjunction with the shift position indicating switches respectively associated with shifter forks 45, 61, 62 and 159 as shown in FIGS. 2 and 8. Whenever coincidence of operation is established between one of the shift indicating switches and a contact bar of the associated shift required relay, no shifting movement will take place. This may be illustrated by referring to switch 90 which is actuated to closed position by engagement with cam ring 86, as shown in FIGS. 2 and 8. With the shift required relay 260A de-energized, as shown in FIG. 8, the contact bar 302 thereof is in normally closed position to complete a series circuit from conductor 294 through the coil of the shift verification relay 297, as hereinbefore explained. Thus, with this condition existing, the circuit is not conditioned to effect shifting movement of the piston rod 85 and shifter fork 45 since there is coincidence between closed contact bar 302 and switch 90.

In the event selector switch 260 is closed to energize relay 260A, the contact bar 302 is immediately moved to open position, thus establishing anti-coincidence with the position indicating switch 90. With the shift required relay 260A energzed, shifting movement of the fork 45 will occur immediately upon depressing the spindle start switch 285. This circuit is completed from the closed contact bar 293, conductor 294, a closed contact bar 369 of energized shift required relay 260A to a conductor 370. from the conductor 370 the circuit continues via a conductor 371 to energize the solenoid 214, thereby conditioning the valve 205 for effecting a shifting movement upon release of the interlock bar 89. Inasmuch as the shift verification relay 297 is not energized, the contact bar 320 thereof is retained in open position to preclude operation of either the forward motor starter 324 or the reverse motor starter 327, until the shift has been completed. A lower contact bar 373 of the relay 297 is retained in normally closed position to condition the circuit for energization of a creep motor starter relay 375 and the main hydraulic valve solenoid 197.

The circuit for energizing the main hydraulic valve solenoid 197 and the creep motor starter relay 375 is completed from the energized conductor 295, one circuit going through the coil of the relay 375, via a conductor 376, the closed contact bar 373, and the closed contact bar of an energized time delay relay 377 to a conductor 378. From the conductor 378, the circuit continues through the normally closed lower contact bars of auxiliary spindle motor plugging relays 358 and 348 to a conductor 379 connected to the energized control conductor 246. Completion of this circuit, incidentally, is delayed slightly until the time delay relay 377 is energized from the conductor 295, via a conductor 381, through the lower normally closed contact bars of relays 348, 358 to conductor 379. The time delay relay 377 functions to momentarily delay energization of the creep motor 70 until after the spindle drive motor has been plugged to a stop. At the same time, a parallel circuit for energizing the main control valve is established from conductor 295, through solenoid 197, and a closed contact bar of energized relay 375 to a conductor 382.

Energization of relay 375 effects upward movement of the three lower contact bars thereof to transmit current from the energized power supply conductors 249, 250 and 251 for energizing the creep motor 70. As hereinbefore explained, energization of solenoid 197 operates the main control valve 193, FIG. 2, to supply pressure fluid to the main supply line 150. This, in turn, unlatches the locking members 89, 155 and supplies hydraulic pressure fluid to the line 204 for engaging the clutch 75 and effecting leftward shifting movement of piston 80, since solenoid 214 is energized. During the shifting interval, switch 149 is opened to preclude energization of the motor 36, until the locking member 89 is again engaged. As soon as shifting movement is completed, FIGS. 2 and 8, switch 91 is actuated to closed position and switch 90 returns to normally open position. Thus, coincidence is immediately established between the closed contact bar 369 of the energized shift required relay 260A, and switch 91 to complete a series circuit for energizing the coil of verification relay 297.

Energization of relay 297 opens the lower contact bar 373 to interrupt the circuit to the creep motor start relay 375 and main valve solenoid 197. Assuming now that the verification relays 298 and 299 are already in energized closed position, a circuit will be completed through the upwardly closed contact bars 322, 321 and 320 of the verification relays and the closed switch 149 to start the spindle motor 36, as hereinbefore described.

Referring to FIGS. 9, 11 and 12, it will now be assumed the manual speed selection knob 271 is positioned to actuate the binary switch 261 for operating the spindle at 85 r.p.m. Closure of switch 261, FIG. 8, effects energization of the corresponding "shift required" relay 261A, moving the upper contact bar 307 thereof into open position and a contact bar 385 to closed position in bridging engagement between conductors 386 and 387. Thus, there is established anti-coincidence between the open contact bar 307 and the closed position indicating switch 115, and the circuit to conductor 310 is interrupted to de-energize solenoid 221. With this condition existing, depressing the spindle start button switch 285 completes a circuit from energized conductor 295, through the closed neutral position indicating switch 138, closed contact bar 306, conductor 386, closed contact bar 385 to conductor 387. The circuit is completed from conductor 387 via a conductor 388 to energize solenoid 222 for effecting the required shifting movement. The shift verification relay 298 is de-energized because the position indicating switch 113 is still in open position. Since the contact bar 321 associated with the relay 298 is in open position, the circuit is interrupted to preclude energization of the spindle motor starters, 324 or 327. Likewise, since a contact bar 389 associated with relay 298 is in normally closed position, a circuit is completed from conductor 376, through the closed contact bar 389 to a conductor 390 connected through the closed contact bar of time delay relay 377. With the contact bar 389 maintained in closed position, therefore, a circuit is completed to energize the creep motor starter 375 and main hydraulic valve solenoid 197 to initiate the required shifting movement, and withdrawal of locking member 89, thus moving switch 149 to open position. At the completion of the required 85 r.p.m. shifting movement, position indicating switch 115 is in open position, and switch 113 is closed, thus completing a circuit from energized conductor 387 to a conductor 391 connected via a conductor 392 to energize the relay 298. Energization of relay 298 moves the contact bar 389 to open position thus de-energizing solenoid 197 and creep motor starting relay 375. Movement of relay contact bar 321 to upwardly closed position, with contact bars 320 and 322 already in closed position completes the circuit for energizing the forward motor starter 324 as soon as the locking member 89 is re-engaged and interlocking switch 149 is closed.

Spindle operation at 140 r.p.m. is obtained by manipulating the manual selector knob 271 to actuate selector switch 262 to closed position, thus energizing the corresponding "shift required" relay 262A to upwardly closed position. As shown in the chart in FIG. 12, selector switches 260, 261, 263 and 264 are in open position whenever the spindle is to be operated at 140 r.p.m. With the "shift required" relay 262A energized, the contact bar 306 is moved to open position and a lower contact bar 394 is moved into bridging engagement between associated conductors 395 and 396. With this condition existing, a slightly different shifting sequence occurs due to the electrical interlock effected by the neutral position indicating switches 114 and 138 respectively. In other words, with the upper contact bar 306 of the energized relay 262A in open position, no circuit can be completed to energize either of the shifting solenoids 221, 222 even though interlocking switch 138 is in closed position.

Likewise, since the lower interlock switch 114 is in open position, no circuit can be completed to energize either of the solenoids 223 or 229, even though the lower contact bar 394 of the relay 262A has been moved to closed position. With the described condition existing, therefore, depressing the spindle start switch 285 energizes conductor 295 to initiate energization of the main valve solenoid 197 and creep motor starter 375 via the circuit connections hereinbefore described. Thus, the creep motor will be energized to effect slow speed rotation of the transmission and the interlock members 89 and 155 will be immediately withdrawn to permit admission of fluid pressure to hydraulic line 204. Inasmuch as all of the solenoids associated with the three position valves 206 and 207 are de-energized at this time, the flow of hydraulic fluid from line 204 will effect movement of both shifter fork 61 and 62 to a neutral disengaged position. As soon as this occurs, the cam rings 112 and 136 respectively associated therewith will actuate both of the neutral position indicating interlock switches 114 and 138 to closed position. This intermediate shift condition is necessary to provide for closure of the neutral position indicating switch 114, FIG. 8, to complete a circuit from energized conductor 295 to conductor 395. With contact bar 394 closed, the actual shifting circuit continues via conductor 396, conductor 397, and the lower normally closed contact bar of relay 261A to a conductor 398. The actual shifting circuit then continues from conductor 398, and conductor 399 to energize solenoid 229 for effecting the required 140 r.p.m. shifting movement. After the shift has been completed, the position indicating switch 139 is moved to closed position, thereby completing a circuit from energized conductor 398, to the conductor 391 for energizing the shift verification relay 298, which operates as hereinbefore explained to render the creep-shift portion of the circuit (E) inactive, and actuate the spindle start portion of the circuit (F).

With the speed selecting knob 271 adjusted to provide spindle operation at 400 r.p.m., only the selector switch 263 is actuated to closed position. As shown in FIG. 8, closure of selector switch 263 completes a circuit from energized conductor 354 through a normally closed contact bar 403a of the relay 254 to energize the coil of the corresponding "shift required" relay 263A, this circuit being completed via a conductor 404 connected to the energized control conductor 246. Energization of relay 263A effects movement of the contact bar 314 associated therewith to open position, as well as movement of a contact bar 403 to closed position. With the contact bar 403 closed, anti-coincidence is immediately established with the open position indicating switch 180 thereby precluding energization of the relay 299 upon closure of spindle start button switch 285. Thus, momentary closure of switch 285 again operates to energize the main control relay 288 for moving the contact bar 293 associated therewith into bridging engagment between energized conductors 292 and 294. Energization of conductors 294 and 295 in turn operates to effect energization of the creep motor starter 375, the main hydraulic valve solenoid 197, as well as the high range shifting solenoid 177. The shift actuating circuit is completed from conductor 295, via conductors 312, 405, contact bar 403 to a conductor 406 connected to energize solenoid 177.

With the position indicating switch 176 in open position, the shift verification relay 299 is de-energized to initially preclude energization of the spindle motor starter, and to provide for energization of the creep motor starter 375 and main valve solenoid 197. A lower contact bar 408 associated with the relay 299 is retained in normally closed position, completing a circuit between conductors 376, 382 to the conductor 390. Thus, as soon as timing relay 377 is energized to closed position, as hereinbefore explained, the contact bar associated therewith is closed to effect sequential energization of the relay 375, and solenoid 197. As soon as the required shifting movement has been effected, position indicating switch 176 is moved to open position, and switch 180 is actuated to closed position completing a circuit via conductors 404 and 315 to energize the relay 299. Energization of relay 299, in turn, moves the contact bar 408 to open position, thus, de-energizing relay 375 and solenoid 197 to permit resiliently biased return of locking member 89, and actuation of switch 149 to closed position. At the same time, the contact bar 322 associated with the relay 299 is moved to closed position, completing the required circuit for energizing the forward motor relay 324, and subsequently effecting energization of the forward auxiliary motor relay 348.

To facilitate the description, the various circuit conditions have been described with one or another of the selector switches 260 to 263 actuated to closed position. It will be apparent that more than one of the switches may be simultaneously actuated to closed position for effecting a coordinated combination of the required shifting movements. For example, an inspection of the chart shown in FIG. 12, reveals that to obtain spindle operation at 2500 r.p.m., the four selector switches 260 to 263 inclusive are simultaneously actuated to closed position. The various combinations of switches that are actuated is determined by the configuration of the various cam lobes presented by cam plate 265, FIG. 11. The angularly adjusted position of the cam plate 265 is determined by the rotatably adjusted position of the manual speed selection knob 271 for effecting a particular speed setting.

For the lowest sixteen operating speeds, i.e. 50 r.p.m. to 2500 r.p.m., selector switch 264 is retained in open position to provide for spindle motor operation at 1800 r.p.m. During the highest three of the nineteen available speeds, switch 264 is retained in closed position to provide for operation of the motor 36 at 3600 r.p.m. It will be apparent that whenever switch 264 is actuated to closed position, three or more of the other selector switches are also actuated to closed position. Inasmuch as the operation and shifting movements effected by switches 260 to 263 inclusive have been described in considerable detail, it is not deemed necessary to repeat the circuit conditions effected by these switches during the highest three operating speeds.

It will now be assumed that the spindle is to be operated at 5000 r.p.m., and the speed selecting knob 271 is manipulated to the proper position for obtaining this speed. Rotation of the knob 271 to the 5000 r.p.m. position effects a corresponding movement of cam plate 265 in a manner that an imaginary diametrical line 411 is positioned to coincide with an imaginary diametrical line 412. With this condition existing, the respective actuating plungers presented by switches 260 to 264 inclusive are engaged by portions of the cam lobes indicated at 413 to 417 inclusive. With all of the selector switches 260 to 264 inclusive simultaneously retained in closed position, all of the corresponding "shift required" relays 260A to 264A inclusive are immediately energized to closed position to establish anti-coincidence in the shift determining portion (C) of the circuit. There is one exception to this, however, since the switch conditions are identical for the 2500 r.p.m. speed as for 5000 r.p.m., with the single exception of switch 264. Thus, in changing from operation at 2500 r.p.m. to 5000 r.p.m., coincidence will already exist in a shift determining portion (C) of the circuit, and only the switch 264 will be operative to effect that particular speed change.

As shown in FIG. 8, closure of switch 264 completes a circuit from the energized conductor 354, through the normally closed contact bar 420 of relay 254 to energize the motor speed control relay 264A. With the relay 264A energized, the lower contact bar 343 thereof is moved to open position to interrupt the circuit between conductors 342 and 344. Likewise, an upper contact bar 421 associated with relay 264A is moved to closed position in bridging engagement between conductors 422 and 423. With this condition existing, momentary closure of spindle start button switch 285 operates, initially to effect the required gear shifting movements in accordance with any conditions of anti-coincidence established in the shift determining portion of the circuit (C). As soon as a condition of coincidence is established in the shift determining portion (C) of the circuit, the shift verification relays 297, 298 and 299 are simultaneously energized to effect energization of the motor 36 at 1800 r.p.m., and, after a brief time interval, at 3600 r.p.m. With the direction switch 319 positioned for forward rotation, a circuit for energizing the forward motor starter 324 is completed as soon as all the contact bars 320, 321 and 322, as well as interlocking switch 149, are in closed position. Simultaneously with the energization of forward motor starter 324, a circuit is established from conductor 247 via a conductor 426 to energize the coil of a time delay relay 427. Energization of relay 427, after a brief timed interval, operates to effect upward movement of a lower contact bar 429 associated therewith into bridging engagement between conductors 423 and 430. Prior to its being moved upwardly, however, the contact bar 429 completes a circuit for energizing the low speed motor starter 337 via the conductor 339, normally closed contact bar 340, a conductor 431, and the conductor 430 connected to the energized conductor 344. Initially, therefore, energization of the forward motor relay 324 effects energization of the spindle motor 36 at 1800 r.p.m., since the low speed starting relay 337 is momentarily engaged. Upward movement of time delay relay contact bar 429 de-energizes the low speed motor starter 337, permitting an upper contact bar 433 to move to normally closed position in bridging engagement between conductors 422 and 434. This completes the circuit for energizing the coil of the high speed motor relay 341. This circuit is completed from the energized conductor 247 via a conductor 435, the coil of the relay 341, conductor 434 and the closed contact bar 433 to a conductor 422. The high speed motor control circuit continues through a closed contact bar 421, the conductor 423, and the upwardly closed contact bar 429 to the conductor 430 connected to energized conductor 344. As hereinbefore explained, energization of the motor 36 in a forward direction, at either the low or high speed, actuates to movable contact bar plugging switch 69 to energize the auxiliary relay 348, thereby completing the holding circuit to the coil of the main control relay 288. Irrespective of whether the spindle motor 36 is stopped at a high or a low rate of speed, the braking action is always effected by operation of the plugging switch 69 at the lowest (1800 r.p.m.) operating speed. This is due to the fact that the time delay relay 427 is deenergized immediately upon de-energization of either the forward or reverse motor starts 324 or 327.

A particular advantage of the automatic electro-hydraulic shifting mechanism is the fact that it is particularly adaptable to be responsive, either to manually initiated automatic speed selection, or program controlled automatic speed selection. As shown in FIG. 8, there is represented a digital control system that may be of any well known type and that is operatively connectable to effect an automatic selection of spindle speeds in any predetermined sequence. Whenever the selector switch 253 is moved into closed position to energize relays 254, 255 and 256, the digital control system represented in the drawings is operatively disposed to energize signal circuits for actuating the control system to shift speeds. With the control system connected for automatic mode operation, the five manually positionable selector switches shown within the box (A) are disconnected from the circuit. Operative determination of speed selection is then obtained by effecting selective energization of one or another of five relays contained within a box (G). The five relays (G) are connected to be selectively energized by signal circuits emanating from the digital control system. When activated during automatic mode, the five relays in the box (G) operate to effect a corresponding energization of the "shift required" relays contained within the box B. After the relays in the box (B) have been predeterminately activated to shift speeds, the digital control system is operative to energize the creep-shift portion of the circuit (E), and subsequently the motor starting portion of the circuit (F) for energizing the spindle motor 36.

Movement of the switch 253 to closed automatic mode position, effects energization of the relay 254 to move an upper contact bar 440 associated therewith to closed position, thus rendering a relay 441, and a relay 442 operative to initiate an automatic shifting and spindle starting cycle. The coil of the relay 442 is connected directly to be energized by the digital control system. At the same time, upward movement of the relay 254 to closed position effects movement of the five other contact bars 367, 445, 446, 403a and 420 to open position for disconnecting the manually controlled selector switches 260 to 264 inclusive. Energization of the relay 255 in response to closure of switch 253 effects movement of normally open contact bars 447, 448 and 449 to closed position, conditioning the circuit for effecting automatic energization of the "shift required" relays 260A, 261A and 262A. In similar manner, energization of the relay 256 effects movement of associated contact bars 450 and 451 to closed position, conditioning the circuit for automatic energization of shift required relay 263A and motor speed control relay 264A. At the same time, a normally closed contact bar 290 associated with the relay 256 is moved to open position to preclude operation of the manually controlled spindle start switch 285 and spindle start relay 288.

During automatic mode, a plurality of automatic selecting relays 454 to 458 inclusive contained within the box G are operative to effect corresponding operation of the five shift required relays 260A to 264A inclusive. Inasmuch as the five automatic speed selecting relays 454 to 458 inclusive perform functions identical to that of manual mode selector switches 260 to 264 inclusive, it is not deemed necessary to describe in detail the various shifting conditions effected by operation of all of the automatic mode relays.

Whenever programmed information requires a spindle speed of 65 r.p.m., a signal circuit from the digital control system is completed via conductors 460, 461 to energize the coil of automatic relay 454, moving a contact bar 462 to closed position. Upon energization of relay 454, a circuit is then completed from conductor 247, via a conductor 463, a common conductor 464, the closed contact bar 462 to a conductor 465. From the conductor 465, the circuit continues via a conductor 467, closed contact bar 447 and a conductor 468 connected to effect energization of the "shift required" relay 260A. However, energization of automatic mode relay 454 is only momentary, and the duration of energization of relay 260A is determined by a simultaneously energizable relay 470. Conductors 472 and 473 are connected to complete a signal circuit from the digital control system to energize the relay 470 simultaneously with relay 454, the latter being de-energized automatically as soon as the "shift required" relay 260A is energized. A holding circuit to retain relay 260A in energized closed position is completed from the conductor 467 via an upper closed contact bar of the relay 260A to a conductor 474. From the conductor 474, the holding circuit continues via a common conductor 475 through the closed contact bar of energized relay 470 to the energized common conductor 464.

Energization or relay 260A effects a condition of anti-coincidence in the shift determining portion (C) of the circuit to provide for the required shifting movement, and subsequent energization of the spindle drive motor 36. Since the control system is conditioned for operation in automatic mode, the signal for actually effecting shifting and starting movement is supplied from the digital control system to energize the relay 442. Closure of the contact bar associated with relay 442 completes a circuit for retaining relay 441 in energized closed position. Energization of relay 441 effects completion of a circuit from the conductor 463, the upwardly closed contact bar 476, closed contact bar 440, through the coil of a spindle start relay 479 to a conductor 480. A holding circuit for retaining the relay 479 in energized closed position is completed via a conductor 481 and the closed contact bar of the relay to conductor 475. Energization of relay 479 likewise effects movement of a lower associated contact bar 482 to closed position, completing a circuit from the energized conductor 247 via a conductor 483 and the contact bar 482 to energize the conductor 295. Upon energization of conductor 295, the required shifting movements and energization of the spindle drive motor 36 is effected in a manner similar to that described for the manually operative system.

During automatic mode, after a shift has been initiated and the spindle energized to operate, the tool spindle will continue to rotate at the selected speed until the relay 470 is de-energized. This occurs in response to subsequent signals from the digital control system, and operates to interrupt the circuit to conductor 475, thereby effecting de-energization of the automatic spindle start relay 479 and whichever of the "shift required" relays contained within the box B that had been previously energized.

While the invention has been shown and described as applied to an automatic speed changing transmission mechanism for a machine tool, it is to be understood that it may be incorporated with equal advantage to obtain automatic speed selection in other transmission mechanisms. The invention has been shown and described as being adapted for either remotely positioned manual control, or alternatively, for response to programmed signal information from a digital control system. It will be apparent, that the invention may be utilized exclusively in response to a manual control system, or exclusively in response to a digital control system, instead of the dual arrangement shown and described in this application. Furthermore, although particular structures have been shown and described in considerable detail as exemplary of the manner in which the invention may be practiced, it will be apparent to those skilled in the art to which this invention relates that various other modifications of the structures shown herein may be effected without departing from the spirit and scope of the invention as defined in the subjoined claims.

The principles of this invention having now been fully explained in connection with the foregoing description, we hereby claim as our invention:

1. In an automatic speed changer, a plurality of shiftably movable gears selectively interconnectable to provide a plurality of different speed ratios, a plurality of selectively actuatable pistons provided with cooperating cylinders and being respectively connected to move said shiftable gears in predetermined coordinated relationship, a hydraulic control system including a main supply line connectable to receive hydraulic fluid under pressure, a plurality of selectively actuatable valves operatively interconnected between said pressure line and hydraulic cylinders carrying said pistons respectively, a presettable controller operative to actuate said valves in predetermined coordinated relationship in a manner that said pistons are correspondingly shifted upon admission of pressure fluid to said main supply line, separate feedback control means connectable to be adjusted by said presettable controller, said feedback control means connected to be actuated upon movement of said pistons to the positions selected by said presettable controller, a single interlock operatively connectable to retain all of said shiftable gears in a selected position of adjustment, a selectively actuatable piston valve and cooperating interlock cylinder connected to selectively release said interlock for permitting shiftable adjustment of said gears, said interlock cylinder connected upon actuation of said piston valve to release said interlock and being connected to transmit pressure fluid to said main supply line, a source of pressure fluid including a selectively actuatable shift start valve connected to transmit pressure fluid to said interlock cylinder for actuating said piston valve for releasing said interlock, said shift start valve being connected to be returned to its starting position by said feedback control means upon arrival of said gears at their selected shiftably adjusted positions.

2. In a speed change transmission mechanism, a power source, a member connectable to be driven by said power source at a selected rate of speed, a plurality of nonshiftable gears and a plurality of shiftable gears operatively interconnectable therewith to transmit power from said source for driving said member at a selected speed ratio, a plurality of hydraulically actuatable shifter devices respectively operable to shift said shiftable gears in any predetermined sequence, mechanical means connected to lock said gears in shiftably adjusted position, hydraulic means connectable to disengage said mechanical means as a prerequisite to a shifting operation, said hydraulic means being connected in series with said hydraulically actuated shifter devices, a source of pressure fluid, an electrically actuated shift control valve operatively interconnected between said source of pressure fluid and said hydraulic means, a plurality of electrically actuated speed selecting valves interconnected between said hydraulic means and said hydraulically actuatable shifter devices, an electrical controller connected to predeterminately energize one or another of said speed selecting valves for conditioning said system to shift said gears, and electrical control means connected to energize said shaft control valve for releasing said mechanical means for permitting shiftable movement of said gears in accordance with the predetermined energization of said speed selecting valves.

3. In a machine tool transmission mechanism, a variable speed gear train comprising a plurality of nonshiftable gears and a plurality of selectively shiftable gears, a power source connected to drive said gear train, a tool spindle connected to be driven by said gear train at a selected one of different speed rates, a mechanical locking device connected to lock said gears in a shiftably adjusted position for operating said spindle at a selected speed rate, a plurality of hydraulically actuatable shifters respectively connected to shift said gears, a plurality of electrical control valves energizeable to transmit hydraulic pressure fluid for actuating said gear shifters, a plurality of fluid conductors connected to transmit pressure fluid to said valves, a hydraulic piston device connected to selectively release said locking device for permitting shifting movement of said gears, said piston device being operable when actuated to transmit pressure fluid to said plurality of hydraulic conductors, said piston device being operable when not actuated to exhaust fluid from said conductors, a source of electrical energy including a controller connectable to energize predetermined ones of said electrical control valves, and a selectively energizeable shift control valve including a source of hydraulic fluid under pressure connected to actuate said piston device for releasing said mechanical locking device and supplying hydraulic fluid under pressure to said hydraulic shifters for effecting shiftable movement of said gears.

4. In a shifting mechanism for a machine tool, a variable speed mechanism including non-shiftable gearing and selectively interconnectable shiftable gearing, a motor connected to drive said variable speed mechanism, a member connected to be driven by said variable speed mechanism, a plurality of hydraulically actuated shifters connected to move said shiftable gearing for varying the speed rate of said driven member, a releasable interlock connected to lock said shiftable gearing in any coordinate shiftably adjusted position of cooperating engagement with said non-shiftable gearing, a plurality of electrically energizeable hydraulic valves connected to transmit pressure fluid for coordinately moving said shifters to selected position for adjusting the speed rate of said driven member, an electric speed selector including a source of electrical energy connectable to selectively energize said valves for conditioning said valves to move said shiftable gearing, a hydraulically actuated piston device connected to release said interlock, said piston device including an output line connected to transmit pressure fluid to said hydraulic valves whenever said interlock is released, and a source of hydraulic fluid under pressure including a selectively operable shift control valve connected to supply pressure fluid to said piston device for releasing said interlock and effecting selective adjustment of said shiftable gearing.

5. In a speed change transmission mechanism, a power source, a member connectable to be driven by said power source at a selected rate of speed, a variable speed transmission comprising a plurality of non-shiftable gears and a plurality of shiftable gears operatively interconnectable therewith to transmit power from said source for driving said member at a selected speed ratio, a plurality of hydraulically actuatable shifter devices respectively operable to shift said shiftable gears in any predetermined sequence, mechanical means connected to lock said shiftable gears in shiftably adjusted position, hydraulic means connectable to disengage said mechanical means as a prerequisite to a shifting operation, said hydraulic means being connected in series with said hydraulically actuated shifter devices, a source of pressure fluid, an electrically actuated shift control valve operatively interconnected between said source of pressure fluid and said hydraulic means, a plurality of electrically actuated speed selecting valves interconnected between said hydraulic means and said hydraulically actuatable shifter devices, an electrical controller connected to predeterminately energize one or another of said speed selecting valves as a prerequisite to shifting said shiftable gears, selectively operable electrical control means connected to energize said shift control valve for releasing said mechanical means for permitting shiftable movement of said shiftable gears in accordance with the predetermined energization of said speed selecting valves, and a slow speed drive mechanism operative to drive said variable speed transmission whenever said electrical control means are operated to initiate a gear shifting movement.

6. In a shifting mechanism for a machine tool, a variable speed mechanism comprising non-shiftable gearing and selectively interconnectable shiftable gearing, a motor connected to drive said variable speed mechanism, a member connected to be driven by said variable speed mechanism, a plurality of hydraulically actuated shifters connected to move said shiftable gearing for varying the speed rate of said driven member, a releasable interlock connected to lock said shiftable gearing in any coordinate shiftably adjusted position, a plurality of electrically energizeable hydraulic valves connected to transmit pressure fluid for coordinately moving said shifters to selected position for adjusting the speed rate of said driven member, an electric speed selector including a source of electrical energy connnectable to selectively energize said valves for conditioning said valves to shift said shiftable gearing, a hydraulically actuated piston device connected to release said interlock, said piston device including an output line connected to transmit pressure fluid to said hydraulic valves whenever said interlock is released, a source of hydraulic fluid under pressure including a selectively operable shift control valve connected to supply pressure fluid to said piston device for releasing said interlock and effecting shiftable adjustment of said gears, and a slow speed driving mechanism automatically connectable to drive said variable speed mechanism whenever said shift control valve is operated to effect a gear shifting movement.

7. In a machine tool transmission mechanism; a variable speed gear train comprising a plurality of nonshiftable gears and a plurality of selectively shiftable gears, a power source connected to drive said gear train, a tool spindle connected to be driven by said gear train at a selected one of different speed rates; a separate slow speed drive mechanism connectable to drive said variable speed gear train; a mechanical locking device connected to lock said gears in a shiftably adjusted position for operating said spindle at a selected speed rate; a plurality of hydraulically actuatable shifters respectively connected to shift said shiftable gears; a plurality of electrical control valves energizeable to transmit hydraulic pressure fluid for actuating said gear shifters; a plurality of fluid conductors connected to transmit pressure fluid to said valves; a hydraulic piston device connected to selectively release said locking device for permitting shifting movement of said gears; said piston device being operable when actuated to transmit pressure fluid to said plurality of hydraulic conductors; said piston device being operable when not actuated to exhaust fluid from said conductors; a source of electrical energy including a controller connectable to energize predetermined ones of said electrical control valves; and a selectively energizeable shift control valve including a source of hydraulic fluid under pressure connected to activate said slow speed mechanism, to actuate said piston device for releasing said mechanical locking device and to supply hydraulic fluid under pressure to said hydraulic shifters for effecting shiftable movement of said gears.

8. In an automatic speed changer; a variable speed transmission mechanism provided with a plurality of shiftably movable gears selectively interconnectable to provide a plurality of different speed ratios; a slow speed mechanism actuatable to drive said transmission at slow speed for facilitating shiftable engagement of said movable gears; a plurality of selectively actuatable pistons provided with cooperating cylinders and being respectively connected to shift said movable gears in predetermined coordinated relationship; a hydraulic control system including a main supply line connectable to receive hydraulic fluid under pressure; a plurality of selectively actuatable valves operatively interconnected between said pressure line and hydraulic cylinders carrying said pistons respectively; a presettable controller operative to actuate said valves in predetermined coordinated relationship in a manner that said pistons are correspondingly shifted upon admission of pressure fluid to said main supply line; separate feedback control means connectable to be selectively preset by said presettable controller; said feedback control means connected to be actuated upon movement of said pistons in accordance with the settings effected by said presettable controller; a single releasable interlock operatively connectable to retain all of said movable gears in a selected position of adjustment; a selectively actuatable piston valve and cooperating interlock cylinder connected to selectively release said interlock for permitting shiftable adjustment of said movable gears; said interlock cylinder being connected to transmit pressure fluid to said main supply line upon actuation of said piston valve to release said interlock; a source of pressure fluid including a selectively actuatable shift start valve connected to transmit pressure fluid to said interlock cylinder for actuating said piston valve for releasing said interlock and to actuate said slow speed mechanism, said shift start valve being connected to be returned to its starting position by said feedback control means upon arrival of said gears at their selected shiftably adjusted positions.

9. In a machine tool, a frame, a tool spindle journalled in said frame, a speed transmission connected to drive said tool spindle and being provided with a plurality of shiftable gears movable in cooperatively coordinated relationship to adjust the output speed thereof, a selectively energizeable motor connected to drive said transmission, a releasable interlock connected to fixedly lock said gears against shiftable movement, an interlock switch connected to be controlled by said interlock, a selectively energizeable control circuit having said interlock switch operatively connected therein, said circuit being actuatable to energize said motor for driving said transmission, said interlock switch being actuated upon release of said interlock to preclude energization of said motor, a slow speed drive mechanism energizeable to drive said transmission to facilitate shiftable engagement of said gears, a plurality of hydraulically actuatable gear shifting devices respectively operative to shift said gears in coordinated relationship, a plurality of hydraulic lines connected to supply hydraulic fluid to said shifting devices, a plurality of predeterminately positionable valves operatively interconnected in said hydraulic lines, means connected to selectively position said valves for effecting the required actuation of said shifting devices upon the admission of hydraulic pressure fluid to said hydraulic lines, a piston valve including a cooperating cylinder operatively connected to release said interlock and to transmit hydraulic pressure fluid to said lines for initiating a shiftable adjustment of said gears, a source of pressure fluid and a selectively energizeable control valve operable to transmit fluid from said source and connected to actuate said piston valve for initiating a shiftable adjustment of said transmission, and an electrical shift control circuit connected to simultaneously energize said slow speed mechanism and said main shift control valve.

10. In an automatic speed changer, a source of driving power, a variable speed transmission mechanism including a plurality of selectively shiftable gears operable in coordinated relationship to selectively vary the output speed therefrom, a releasable interlock connected to retain said gears in any selected shiftably adjusted position, hydraulically actuatable shifters operatively connected to shift said gears in predetermined coordinated relationship, a hydraulic piston valve and cooperating cylinder operative to release said interlock as a prerequisite to shiftably moving said gears, a plurality of selectively positionable valves including hydraulic circuit connections operatively interconnected between said piston valve cylinder and said hydraulically actuatable gear shifters, said valves being connected to be actuated in predetermined coordinated relationship for actuating said shifters to effect the required selective shiftable movement of said gears, a source of hydraulic pressure fluid including a selectively actuatable valve and a hydraulic line connectable to transmit fluid from said source for actuating said piston valve to release said interlock, slow speed driving means connected to drive said variable speed transmission for facilitating shiftable adjustment of said gears, power drive control means including a source of electrical energy connectable to energize said power source for driving said variable speed mechanism whenever said interlock is engaged to lock said gears against shiftable movement, an interlocking switch operatively interconnected in said power drive control means connected to be actuated by release of said interlock to preclude energization of said power source, and a shift control connected to be energized by energy from said source and operative to simultaneously actuate said slow speed mechanism and said valve to initiate a shiftable adjustment of said variable speed transmission mechanism.

11. In a speed change mechanism, non-shiftable gearing, a plurality of shiftable gears selectively interconnectable with said non-shiftable gearing, a motor connected to drive said mechanism, a member connected to be driven by said mechanism at a selected speed rate, a plurality of power actuators respectively operative to shift said gears in coordinated relationship for varying the speed rate of said member, a plurality of presettable control means operable to activate said power actuators in coordinated relationship, a releasable interlock operative to lock said gears in shiftably adjusted positions, a presettable control operative in code fashion to preset said control means for effecting subsequent activation of said power actuators, an interlock actuator operable to release said interlock, and a shift start control connected to activate said interlock actuator for initiating a shifting cycle, said interlock actuator being automatically connected upon release of said interlock to activate said power actuators for effecting shifting movement of said shiftable gears in accordance with the preset condition of said control means.

12. In an automatic speed changer, a plurality of shiftably movable gears selectively interconnectable to provide a plurality of different speed ratios, a plurality of selectively actuatable pistons provided with cooperating cylinders and being respectively connected to move said shiftable gears in predetermined coordinated relationship, a hydraulic control system including a main supply line connectable to receive hydraulic fluid under pressure, a plurality of selectively actuatable valves operatively interconnected between said pressure line and the hydraulic cylinders carrying said pistons respectively, a presettable controller operative to actuate said valves in predetermined coordinated relationship in a manner that said pistons are correspondingly shifted upon admission of pressure fluid to said main supply line, separate feedback control means connectable to be adjusted by said presettable controller, said feedback control means connected to be actuated upon movement of said pistons to the positions selected by said presettable controller, a plurality of interlocks operatively connectable to retain different groups of said shiftable gears in a selected position of adjustment, an independent manual controller operatively interconnectable between one of said interlocks and said associated gear, said manual controller being releasable from said associated interlock for effecting manual movement of said associated gear independently of said presettable controller, separate selectively actuatable piston valves and cooperating interlock cylinders respectively connected to selectively release said interlocks for permitting shiftable adjustment of said gears, said interlock cylinders connected upon actuation of said piston valves to release said interlocks and being connected to transmit pressure fluid to said main supply line, a source of pressure fluid including a selectively actuatable shift start valve connected to transmit pressure fluid to said interlock cylinders for actuating said piston valves for releasing said interlocks, said shift start valve being connected to be returned to its starting position by said feedback control means upon arrival of said gears at their selected shiftably adjusted positions.

13. In a speed change transmission mechanism for a machine tool, non-shiftable gearing, a plurality of shiftable gears selectively interconnectable with said non-shiftable gearing, a motor connected to drive said mechanism, a tool spindle connected to be driven by said mechanism at a selected speed rate, a plurality of power actuators respectively operative to effect shifting movement of said gears for varying the speed rate of said tool spindle, a plurality of presettable control means operable to activate said power actuators in coordinated relationship, a releasable interlock operative to lock said gears in selected shiftable adjusted positions, a presettable control operative in code fashion to preset said control means for effecting subsequent activation of said power actuators, an interlock actuator operable to release said interlock to permit shifting movement of said gears, a shift start control connected to activate said interlock actuator for initiating a shifting cycle, said interlock actuator being automatically connected upon release of said interlock to activate said power actuators for effecting shifting movement of said shiftable gears in accordance with the preset condition of said control means, and shift indicating means responsive to completion of the selected shifting movement of said power actuators being connected to deactivate said interlock actuator in such a manner that said interlock is moved into locking position with said gears for retaining them in the selected positions of shiftable adjustment.

14. In an automatic speed changer, a source of driving power, a variable speed transmission mechanism including a plurality of selectively shiftable gears operable in coordinated relationship to selectively vary the output speed therefrom, a plurality of releasable interlocks connected to retain said gears in any selected shiftably adjusted position, manually operative gear shift means operably interconnected between one of said interlocks and an associated one of said gears, said gear shift means being manually releasable from said associated interlock for effecting independent manual shifting movement of said associated gear, hydraulically actuatable shifters operatively connected to shift said gears in predetermined coordinated relationship, a hydraulic piston valve and cooperating cylinder operative to release said interlocks as a prerequisite to shiftably moving said gears, a plurality of selectively positionable valves including hydraulic circuit connections operatively interconnected between said piston valve cylinder and said hydraulically actuatable gear shifters, said valves being connected to be actuated in predetermined coordinated relationship for actuating said shifters to effect the required selective shiftable movement of said gears, a source of hydraulic pressure fluid including a selectively actuatable valve and a hydraulic line connectable to transmit fluid from said source for actuating said piston valve to release said interlocks, slow speed driving means connected to drive said variable speed transmission for facilitating shiftable adjustment of said gears, power drive control means including a source of electrical energy connectable to energize said power source for driving said variable speed mechanism whenever said interlocks are engaged to lock said gears against shiftable movement, an interlocking switch operatively interconnected in said power drive control means connected to be actuated by release of said interlocks to preclude energization of said power source, and a shift control connected to be energized by energy from said source and operative to simultaneously actuate said slow speed mechanism and said piston valve to initiate a shiftable adjustment of said variable speed transmission mechanism.

References Cited in the file of this patent

UNITED STATES PATENTS

| | | |
|---|---|---|
| 1,544,909 | Josephs et al. | July 7, 1925 |
| 2,035,678 | Swift | Mar. 31, 1936 |
| 2,121,157 | Lempereur et al. | June 21, 1938 |
| 2,233,790 | Linsley | Mar. 4, 1941 |
| 2,556,834 | Ashton et al. | June 12, 1951 |
| 2,943,502 | Perkins et al. | July 5, 1960 |
| 2,943,719 | McNamara et al. | July 5, 1960 |

FOREIGN PATENTS

| | | |
|---|---|---|
| 506,223 | Germany | Aug. 30, 1930 |